United States Patent
Liu

(10) Patent No.: US 10,169,949 B2
(45) Date of Patent: Jan. 1, 2019

(54) METHOD AND DEVICE FOR RECEIVING ARTICLE, AND METHOD AND SYSTEM FOR DELIVERING ARTICLE

(71) Applicant: GUANGZHOU XAIRCRAFT TECHNOLOGY CO., LTD., Guangdong (CN)

(72) Inventor: Peng Liu, Guangdong (CN)

(73) Assignee: GUANGZHOU XAIRCRAFT TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 15/552,057

(22) PCT Filed: Aug. 25, 2016

(86) PCT No.: PCT/CN2016/096726
§ 371 (c)(1),
(2) Date: Aug. 18, 2017

(87) PCT Pub. No.: WO2017/032333
PCT Pub. Date: Mar. 2, 2017

(65) Prior Publication Data
US 2018/0075688 A1    Mar. 15, 2018

(30) Foreign Application Priority Data

Aug. 26, 2015 (CN) .......................... 2015 1 0536771

(51) Int. Cl.
*G07F 17/12* (2006.01)
*G05D 1/10* (2006.01)
(Continued)

(52) U.S. Cl.
CPC .......... *G07F 17/12* (2013.01); *A47G 29/141* (2013.01); *B64F 1/32* (2013.01); *G05D 1/101* (2013.01); *G06Q 10/083* (2013.01)

(58) Field of Classification Search
CPC ................................ G07F 17/12; G05D 1/101
(Continued)

(56) References Cited

U.S. PATENT DOCUMENTS 9,527,605 B1 * 12/2016 Gentry ...................... B64F 1/12
9,840,340 B2 * 12/2017 O'Toole .................... B64F 1/32
(Continued)

FOREIGN PATENT DOCUMENTS

| CN | 202282043 A | 6/2012 |
| CN | 104616403 A | 5/2015 |
| CN | 204440556 A | 7/2015 |

OTHER PUBLICATIONS

Supplementary Search Report dated Mar. 7, 2018 from the corresponding Chinese Application No. 2015105367717.

*Primary Examiner* — Omar Casillashernandez
(74) *Attorney, Agent, or Firm* — Porter Wright Morris & Arthur LLP

(57) ABSTRACT

A method and device for receiving the article and a method and system for delivering article are provided in the disclosure. The device for receiving the article (200) includes: a box body (10); a door (20), arranged on the box body (10); and a wireless communication module, configured to perform unlocking matching with an aircraft (100), control the door (20) to be in an open state after unlocking matching succeeds, and send a delivery instruction to the aircraft (100). The technical problem where an article cannot be automatically unloaded after being delivered to a destination is solved.

18 Claims, 4 Drawing Sheets

(51) Int. Cl.
*A47G 29/14* (2006.01)
*B64F 1/32* (2006.01)
*G06Q 10/08* (2012.01)

(58) Field of Classification Search
USPC .......................................................... 340/5.22
See application file for complete search history.

(56) References Cited

U.S. PATENT DOCUMENTS

| | | | |
|---|---|---|---|
| 2015/0175276 A1* | 6/2015 | Koster | B64F 1/32 244/114 R |
| 2016/0140496 A1* | 5/2016 | Simms | G06Q 10/0835 705/337 |
| 2016/0159496 A1* | 6/2016 | O'Toole | B64F 1/32 244/110 E |
| 2016/0257423 A1* | 9/2016 | Martin | B64F 1/00 |
| 2016/0300187 A1* | 10/2016 | Kashi | G06Q 10/0836 |
| 2016/0307449 A1* | 10/2016 | Gordon | G08G 5/0069 |
| 2017/0011340 A1* | 1/2017 | Gabbai | G06Q 10/0836 |

* cited by examiner

METHOD AND DEVICE FOR RECEIVING ARTICLE, AND METHOD AND SYSTEM FOR DELIVERING ARTICLE

TECHNICAL FIELD

The embodiments of the disclosure relate to the field of aircrafts, in particular to a method and device for receiving article, and a method and system for delivering article.

BACKGROUND

An article may be delivered by using an aircraft (e.g., unmanned aerial vehicle) in the conventional art. When the article is delivered by using the aircraft, it is necessary to take it down manually during an article transfer process or a terminal delivery process, and the aircraft cannot automatically deliver the article to a destination.

Any effective solution has not been proposed yet at present for the abovementioned problem.

SUMMARY

Embodiments of the disclosure provide a method and device for receiving article, and a method and system for delivering article, which are used to at least solve the technical problem in the conventional art where an article cannot be automatically unloaded after being delivered to a destination.

According to an aspect in the embodiments of the disclosure, a device for receiving article is provided, which includes: a box body; a door, arranged on the box body; and a wireless communication module, configured to perform unlocking matching with an aircraft, control the door to be in an open state after unlocking matching succeeds, and send a delivery instruction to the aircraft.

In an embodiment of the disclosure, the wireless communication module is further configured to control, after the box body receives a delivered article, the door to be in a closed state.

In an embodiment of the disclosure, the device for receiving the article further includes: a delivery judgment module, configured to acquire an available capacity of the box body, and judge whether the available capacity of the box body is greater than or equal to the volume of the article; and a delivery indicating module, configured to send, when it is judged that the available capacity of the box body is greater than or equal to the volume of the article, information for indicating that the delivery of the article is allowed.

In an embodiment of the disclosure, the device for receiving the article further includes: a capacity judgment module, configured to detect, when the available capacity of the box body is acquired, whether an article is stored in the box body, wherein when it is detected that an article is stored in the box body, a residual capacity of the box body is calculated according to a total capacity and an occupied capacity of the box body, and the residual capacity serves as the available capacity; and when it is detected that an article is not stored in the box body, the total capacity of the box body serves as the available capacity.

In an embodiment of the disclosure, the device for receiving the article further includes: a conveying device, configured to convey the article in the box body out of the box body.

In an embodiment of the disclosure, the device for receiving the article further includes: an unlocking device, configured to: receive, after unlocking matching between the wireless communication module and the aircraft succeeds, a control instruction of the wireless communication module to control the door to be opened; and/or receive, after the article is received, a control instruction of the wireless communication module to control the door to be closed.

In an embodiment of the disclosure, the device for receiving the article further includes at least one of the following modules: an internet communication module, configured to receive a first unlocking key through the internet, the first unlocking key is used for performing unlocking matching with a second unlocking key carried by the aircraft; a key storage module, configured to store the first unlocking key on the device for receiving the article locally; and a key generation module, configured to generate, according to a preset key generation algorithm, the first unlocking key.

In an embodiment of the disclosure, the device for receiving the article further includes: a guidance identifier, arranged on the box body and configured to guide the aircraft to hover over the box body or lands on the box body.

In an embodiment of the disclosure, the device for receiving the article further includes: an undercarriage fixing position, arranged at an edge of an upper surface of the box body, the undercarriage fixing position is provided with a fixing groove for fixing an undercarriage of the aircraft.

In an embodiment of the disclosure, the device for receiving the article further includes: a damping device, arranged in the box body and configured to prevent the article from falling down from the aircraft to be damaged.

According to an aspect in the embodiments of the disclosure, a method for receiving article is provided, which includes: receiving a delivery request sent by an aircraft for an article to be delivered; after the delivery request is received, acquiring a first unlocking key of a device for receiving the article, wherein the delivery request carries a second unlocking key; judging whether the second unlocking key is matched with the first unlocking key; after the second unlocking key is matched with the first unlocking key, controlling a door of the device for receiving article to be in an open state; and sending a delivery instruction to the aircraft.

In an embodiment of the disclosure, after the delivery instruction is sent to the aircraft, the method further includes: after information for indicating that the aircraft completes delivery is detected, controlling the door of the device for receiving the article to be in a closed state.

In an embodiment of the disclosure, before the delivery instruction is sent to the aircraft, the method further includes: acquiring the volume of the article to be delivered; acquiring an available capacity of the device for receiving the article; judging whether the available capacity is greater than or equal to the volume; and when it is judged that the available capacity is greater than or equal to the volume, determining to send the delivery instruction to the aircraft.

In an embodiment of the disclosure, acquiring an available capacity of the device for receiving the article includes: detecting whether an article is stored in the device for receiving the article; in a case that an article is stored in the device for receiving the article, calculating a residual capacity of the device for receiving the article according to a total capacity and an occupied capacity of the device for receiving the article, and taking the residual capacity as the available capacity; and in a case that an article is not stored in the device for receiving the article, taking the total capacity of the device for receiving the article as the available capacity.

In an embodiment of the disclosure, after the delivery instruction is sent to the aircraft, the method further includes: receiving indicating information for conveying the article in the device for receiving the article; and conveying the article in the device for receiving the article out of the device for receiving the article according to the indicating information.

In an embodiment of the disclosure, the first unlocking key includes at least one of the following keys: an unlocking key received through the Internet; an unlocking key stored on the device for receiving the article locally; and an unlocking key generated according to a preset key generation algorithm.

In an embodiment of the disclosure, after the delivery instruction is sent to the aircraft, the method further includes: receiving indicating information for a user to open the door of the device for receiving the article; and controlling, according to the indicating information, the door to be in an open state.

According to an aspect in the embodiments of the disclosure, an article delivery method is provided, which includes: sending a delivery request to a device for receiving the article; receiving a delivery instruction sent by the device for receiving the article, wherein the delivery instruction is an instruction in response to the delivery request after a first unlocking key and a second unlocking key of the device for receiving the article are successfully matched, the second unlocking key is an unlocking key carried by the delivery request; and delivering an article to the device for receiving the article according to the delivery instruction.

In an embodiment of the disclosure, before the delivery instruction sent by the device for receiving the article is received, the method further includes: receiving a volume query request sent by the device for receiving the article, the volume query request is used for requesting to query the volume of the article; and sending, in response to the volume query request, the volume of the article to the device for receiving the article.

In an embodiment of the disclosure, before the delivery request is sent to the device for receiving the article, the method further includes: acquiring location information of the device for receiving the article waiting for receiving the article; searching for the device for receiving the article according to the location information; and after the device for receiving the article is found, landing on the found device for receiving the article according to a guidance identifier of the device for receiving the article.

In an embodiment of the disclosure, searching for the device for receiving the article according to the location information includes: acquiring a route of flight to the device for receiving the article corresponding to the location information; and flying to the device for receiving the article according to the route.

In an embodiment of the disclosure, after the article is delivered to the device for receiving the article according to the delivery instruction, the method further includes: acquiring a return route, and returning according to the return route; or acquiring a flight route of a next delivery destination, and flying to the next delivery destination according to the flight route.

In an embodiment of the disclosure, the step of acquiring a flight route of a next delivery destination and flying to the next delivery destination according to the flight route includes: acquiring a flight route of the next delivery destination; calculating, according to the flight route, a battery capacity needed for the aircraft to fly from a current location to the next delivery destination; acquiring a current residual battery capacity of the aircraft; judging whether the current residual battery capacity of the aircraft is greater than the battery capacity needed for the aircraft to fly from the current location to the next delivery destination; and if so, flying to the next delivery destination according to the flight route.

According to an aspect in the embodiments of the disclosure, an article delivery system is provided, which includes: an aircraft, configured to convey and deliver an article; one or more device for receiving the articles, communicating with the aircraft, and configured to receive the article delivered by the aircraft; and a dispatching device, communicating with both the aircraft and the device for receiving the article, and configured to send an unlocking key for unlocking the device for receiving the article to the aircraft and the device for receiving the article.

In an embodiment of the disclosure, the dispatching device is further configured to receive delivered information sent by the device for receiving the article, and update dispatching state information of the aircraft according to the delivered information, the delivered information is sent by the device for receiving the article after receiving the article.

In an embodiment of the disclosure, the dispatching device is further configured to send the delivered information to an addresser and/or an addressee corresponding to article delivery.

BRIEF DESCRIPTION OF THE DRAWINGS

The drawings forming a part of the disclosure are adopted to provide further understanding of the disclosure, and the schematic embodiments and description of the disclosure are adopted to explain the disclosure, and do not form improper limits to the disclosure. In the drawings.

DETAILED DESCRIPTION OF THE EMBODIMENTS

Figure 1:
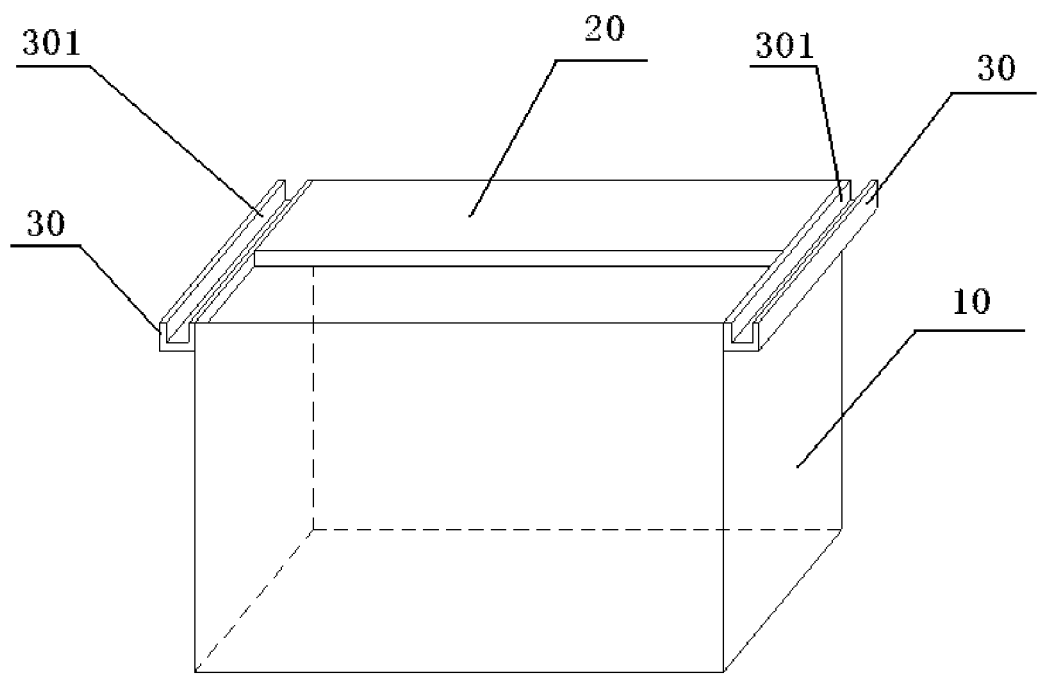
FIG. 1 is an alternative diagram of a device for receiving article according to an embodiment of the disclosure.

In order to make a person skilled in the art better understand the solutions of the disclosure, the technical solutions in the embodiments of the disclosure will be clearly and completely described hereinbelow with reference to the drawings in the embodiments of the disclosure. Obviously, the described embodiments are only a part of the embodiments of the disclosure, not all of the embodiments. On the basis of the embodiments in the disclosure, all other embodiments obtained on the premise of no creative work of a person skilled in the art should fall within the scope of protection of the disclosure.

It is important to note that the description and claims of the disclosure and terms 'first', 'second' and the like in the drawings are used for distinguishing similar objects instead of distinguishing a specific sequence or a precedence order. It will be appreciated that data used in such a way may be exchanged under appropriate conditions, in order that the embodiments of the disclosure described here can be implemented in a sequence other than sequences graphically shown or described here. In addition, terms 'including' and 'having' and any inflexions thereof are intended to cover non-exclusive inclusions. For example, it is not limited for processes, methods, systems, products or equipment containing a series of steps or units to clearly list those steps or units, and other steps or units which are not clearly listed or are inherent to these processes, methods, products or equipment may be included instead.

Embodiment 1

The disclosure provides a device for receiving article. The device for receiving the article can automatically control a door 20 to be opened, so as to automatically receive an article delivered by an aircraft, thus solving the problem in the conventional art where an article cannot be automatically unloaded after being delivered to a destination. In an embodiment of the disclosure, the device for receiving the article can also automatically control the door 20 to be closed, and can control the door 20 to be in a closed state after receiving the article delivered by the aircraft, thus ensuring the safety of article delivery.

FIG. 1 is an alternative diagram of a device for receiving article according to an embodiment of the disclosure. As shown in FIG. 1, the device for receiving the article includes a box body 10, a door 20 arranged on the box body 10, and a wireless communication module (not shown in FIG. 1). When an aircraft delivers an article, the door 20 is opened, and in addition, after the article is completely delivered, the door 20 may also be closed. The wireless communication module arranged in the device for receiving the article communicates with the aircraft to perform unlocking matching, controls the door 20 to be opened after unlocking matching succeeds, namely controls the door 20 to be in an open state, and sends a delivery instruction to the aircraft. Otherwise, the door 20 is controlled to be in a closed state. In addition, the wireless communication module may also be configured to control, after the box body 10 receives the delivered article, the door 20 to be in a closed state. The aircraft may deliver the article from an upper surface of the device for receiving the article. Therefore, the door 20 is arranged on an upper surface of the box body 10 preferably, in order that the aircraft delivers the article. Alternatively, the door 20 may also be arranged on a side surface of the box body 10, and may be a roller shutter door or a sliding door. FIG. 1 only shows a situation that the door 20 is arranged on the upper surface, and is only intended to describe an existing form of the door 20, the doors 20 at other locations and of other shapes may be applied to the present application, and no limitations are made herein.

As shown in FIG. 1, a scenario where the door 20 is arranged on the upper surface of the box body 10 is taken as an example for description. The device for receiving the article further includes an undercarriage fixing position 30 arranged at an edge of the upper surface of the box body 10, the undercarriage fixing position 30 is provided with a fixing groove 301 for fixing an undercarriage of the aircraft. When the undercarriage of the aircraft falls down in the fixing groove, the fixing groove may fix the aircraft to the device for receiving the article. As shown in FIG. 1, the undercarriage fixing position 30 is parallel to the door 20, so as to avoid influence on fixing of the undercarriage caused by opening and closing of the door 20. Alternatively, when the door 20 is a roller shutter door, a setting relationship between the door 20 and the undercarriage fixing position 30 may not be limited, as long as it is ensured that fixing of the undercarriage to the device for receiving the article is not influenced by opening and closing of the door 20. It is important to note that the door 20 and the undercarriage fixing position 30 in the present application may not be limited to the form shown in FIG. 1, corresponding or equivalent transformations falling within the scope of protection of the disclosure.

The device for receiving the article in the abovementioned embodiment can communicate with the aircraft to perform unlocking matching, so the door 20 can be automatically controlled to be in an open state, and article delivery can be completed.

Alternatively, it is first judged whether the device for receiving the article is large enough to receive the article delivered by the aircraft before delivering the article. That is, the device for receiving the article further includes: a delivery judgment module, configured to acquire an available capacity of the box body 10, and judge whether the available capacity of the box body 10 is greater than or equal to the volume of the article; and a delivery indicating module, configured to send, when it is judged that the available capacity of the box body 10 is greater than or equal to the volume of the article, information for indicating that the delivery of the article is allowed.

Specifically, the device for receiving the article further includes: a capacity judgment module, configured to detect, when the available capacity of the box body 10 is acquired, whether an article is stored in the box body 10, wherein when it is detected that an article is stored in the box body 10, a residual capacity of the device for receiving the article is calculated according to a total capacity and an occupied capacity of the box body 10, and the residual capacity serves as the available capacity; and when it is detected that an article is not stored in the box body 10, the total capacity of the box body 10 serves as the available capacity.

When it is judged whether the available capacity of the box body 10 is greater than or equal to the volume of the article, the situation that the article has been stored in the box body 10 is taken into consideration. Therefore, it may be first judged whether an article is stored in the box body 10.

In a case that an article is not stored in the box body 10, the self-capacity of the box body 10 is the available capacity of the box body 10, and when the available capacity is greater than or equal to the volume of the article, information for indicating that the delivery of the article is allowed is sent. In a case that an article is stored in the box body 10, a residual capacity obtained by subtracting the volume of the stored article from the self-capacity of the box body 10 is the available capacity of the box body 10. Likewise, when the available capacity is greater than or equal to the volume of the article, information for indicating that the delivery of the article is allowed is sent. In a case that the available capacity is smaller than the volume of the article, indicating information for indicating that delivery cannot be performed is sent to the aircraft.

Alternatively, the device for receiving the article further includes: a conveying device, configured to convey the article in the box body 10 out of the box body 10. The conveying device may convey the article to a specified location such as an article sorting platform or an article shelf. The conveying device may conveniently convey out some large articles or multiple articles.

Alternatively, the door 20 is controlled to be opened and closed, and the device for receiving the article and the aircraft need to communicate each other to perform unlocking matching. Before unlocking matching is performed, the aircraft and the device for receiving the article possess an unlocking key for matching respectively. That is, the device for receiving the article further includes at least one of the following modules: an internet communication module, configured to receive a first unlocking key through the internet, the first unlocking key is used for performing unlocking matching with a second unlocking key carried by the aircraft; a key storage module, configured to store the first unlocking key on the device for receiving the article locally; and a key generation module, configured to generate, according to a preset key generation algorithm, the first unlocking key. The key storage module may be a module arranged on the device for receiving the article, the module is set when the device for receiving the article leaves the factory, and the first unlocking key is stored in the module. The preset key generation algorithm is stored in the key generation module, the algorithm may generate the first unlocking key, for example, the key generation module is controlled to generate the first unlocking key when the delivery request of the aircraft is received, and various existing key generation algorithms may be adopted to generate an unlocking key.

The device for receiving the article receives the first unlocking key through the internet communication module, and after the aircraft hovers over the device for receiving the article or lands on the device for receiving the article, the second unlocking key of the aircraft is received through the wireless communication module to be prepared for unlocking matching between the first unlocking key and the second unlocking key. In a case that the first unlocking key and the second unlocking key are a pair of matched keys, the device for receiving the article succeeds in unlocking matching between the first unlocking key and the second unlocking key. In a case that the second unlocking key that is sent to the device for receiving the article by the aircraft and used for performing unlocking matching and the first unlocking key stored in the device for receiving the article are not a pair of matched keys, unlocking matching between the first unlocking key and the second unlocking key is unsuccessful.

Likewise, a method for matching the first unlocking key stored in the key storage module and the first unlocking key in the key generation module is the same as the abovementioned method, and is not elaborated herein. It is important to note that any one of the abovementioned three first unlocking key acquisition modules may be selected to be arranged on the device for receiving the article, or any two or three of the abovementioned three first unlocking key acquisition modules may be arranged on the device for receiving the article.

Alternatively, the device for receiving the article further includes: an unlocking device, configured to: receive, after unlocking matching between the wireless communication module and the aircraft succeeds, a control instruction of the wireless communication module to control the door 20 to be opened, such that the door 20 is in an open state; and/or receive, after the article is received, a control instruction of the wireless communication module to control the door to be closed, such that the door 20 is in a closed state. The unlocking device may perform unlocking matching by utilizing the first unlocking key received by the internet communication module and the second unlocking key carried by the aircraft, after unlocking matching succeeds, the door 20 is controlled to be opened, and the aircraft delivers the article through the door 20 in the open state; and when unlocking matching does not succeed, the aircraft cannot deliver the article to the device for receiving the article. After the article is received, the unlocking device can control the door 20 to be closed, such that the door 20 is in a closed state.

Alternatively, the aircraft may fly according to a preset route when flying to the device for receiving the article, and the aircraft may be positioned through a GPS, a base station and the like. However, the aircraft is not accurately positioned, and there is an offset during article delivery. In order to reduce the offset, the aircraft can accurately hover over the box body 10 or accurately land on the undercarriage fixing position 30 of the box body 10. The box body 10 of the device for receiving the article is also provided with a guidance identifier, the guidance identifier may be a graph, a pattern or the like, and the guidance identifier can uniquely identify a device for receiving the article. The aircraft may accurately determine the location of the device for receiving the article according to the guidance identifier in order to deliver an article.

Alternatively, the device for receiving the article also includes: a data carrier, including an identity code, the identity code is used for identifying identity information and location information of the device for receiving the article and associated with user information of a user who receives the article. The identity code may include texts, numbers and characters, the identity code is a unique identifier of each device for receiving the article, and an identity code corresponds to a geographical location, and corresponds to one or more articles and a user corresponding to the articles. As shown in Table 1, an identity code X corresponds to a geographical location L, and an article A and an article B belonging to a user P may be delivered to a device for receiving the article at the geographical location L. The user may extract the article A and the article B according to the geographical location L of the device for receiving the article.

TABLE 1

| Identity code X | Geographical location L | Article A Article B | User P |
| --- | --- | --- | --- |

That is, the location of the device for receiving the article is received by the user before the aircraft delivers the article, or, the location information of the device for receiving the article may be received by the user after the device for receiving the article sends delivered information. After the location information of the device for receiving the article is received and it is determined that the article has been delivered, the user may extract the article from the device for receiving the article that has received the article. Herein, when extracting the article, the user may be authenticated in a Near Field Communication (NFC) manner, a radio frequency manner, a Bluetooth manner, a password manner or other manners to open the device for receiving the article. User information may be information needed by opening the device for receiving the article.

Alternatively, the device for receiving the article further includes: a damping device, arranged in the box body 10 and configured to prevent the article from falling down from the aircraft to be damaged. The damping device may be a damping spring, damping foam or a damping airbag arranged at a box bottom.

By means of the device for receiving the article in the present embodiment, unlocking matching may be performed between the aircraft and the device for receiving the article, and after unlocking matching succeeds, the door 20 of the device for receiving the article is controlled to be in an open state. The door 20 of the device for receiving the article may be automatically opened according to unlocking matching. In addition, the aircraft can be accurately guided to land on the device for receiving the article through the guidance identifier. After receiving the article, the device for receiving the article automatically closes the door 20, so the door 20 is in a closed state, and the user unlocks the door 20 through user information.

Embodiment 2

According to the embodiment of the disclosure, an article delivery system is provided. The article delivery system may serve as a system for an aircraft to deliver an article. The aircraft may be an unmanned aerial vehicle, a hot-air balloon or the like. The following embodiment is illustrated with the unmanned aerial vehicle.

Figure 2:
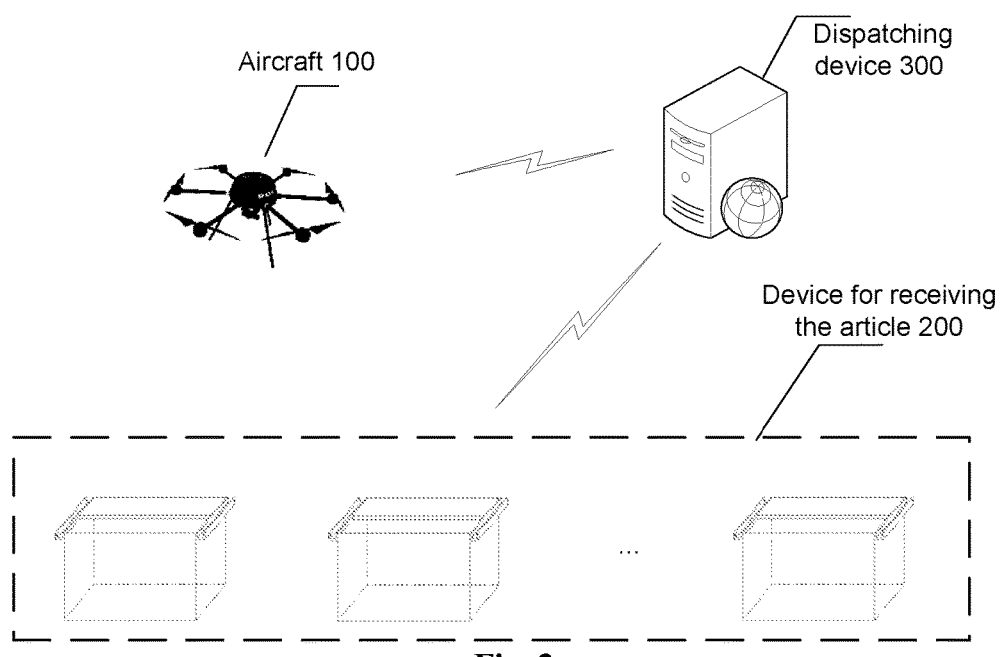
FIG. 2 is an alternative diagram of an article delivery system according to an embodiment of the disclosure.

FIG. 2 is an alternative diagram of an article delivery system according to an embodiment of the disclosure. As shown in FIG. 2, the article delivery system includes an aircraft 100, one or more device for receiving the articles 200 and a dispatching device 300, wherein the aircraft 100 is configured to convey and deliver an article; the one or more device for receiving the articles 200 communicate with the aircraft 100, and are configured to receive the article delivered by the aircraft 100; and the dispatching device 300 communicates with both the aircraft 100 and the device for receiving the article 200, and is configured to send an unlocking key for unlocking the device for receiving the article 200 to the aircraft 100 and the device for receiving the article 200.

The dispatching device 300 records correspondences among the device for receiving the article 200, the article, the unmanned aerial vehicle and a user, and may record these pieces of information by using a table as shown in Table 2.

TABLE 2

| Device for receiving the article 200 Identity information ID1, location information L1 First unlocking key | Article Unmanned aerial vehicle User | Article code A1 Aircraft 100 code F1 Second unlocking key User code U1 |
|---|---|---|

As shown in Table 2, each correspondence includes the device for receiving the article 200, the unmanned aerial vehicle, the article and the user, the unmanned aerial vehicle may determine the location of the device for receiving the article 200 according to the correspondence, and the user may also acquire the location of the device for receiving the article 200 in order to extract the article. Location information of the device for receiving the article 200 may be GPS coordinates and the like. The dispatching device 300 sets codes for the device for receiving the article 200, the article, the unmanned aerial vehicle and the user in order to more accurately manage the device for receiving the article 200, the unmanned aerial vehicle and the article, so as to accurately deliver the article to the corresponding user.

Alternatively, before the dispatching device 300 controls the aircraft 100 to deliver the article, more articles may be delivered once, and before delivery, it is judged whether the capacity of the device for receiving the article 200 is large enough to receive the article delivered by the device for receiving the article 200. The device for receiving the article 200 may be set as devices having different capacities, and the dispatching device 300 allocates the device for receiving the article 200 capable of holding an article, to be delivered, to the aircraft 100 according to the volume of the article to be delivered and the capacity of the device for receiving the article 200.

The dispatching device 300 sends route information to the unmanned aerial vehicle, and the unmanned aerial vehicle may fly to the device for receiving the article 200 according to the route information. The dispatching device 300 may also send the location or number of the device for receiving the article 200 to the user, and the user extracts the article according to the received information. In order to achieve automatic unlocking, the dispatching device 300 sends a first unlocking key to the device for receiving the article 200 and sends a second unlocking key to the unmanned aerial vehicle 100, wherein the first unlocking key and the second unlocking key are a pair of matched keys, in order to perform unlocking matching between the unmanned aerial vehicle and the device for receiving the article 200, thus achieving the aim that the device for receiving the article 200 automatically receives the article delivered by the unmanned aerial vehicle.

Alternatively, the dispatching device 300 is also configured to receive delivered information sent by the device for receiving the article 200, and updates dispatching state information of the aircraft 100 according to the delivered information, wherein the delivered information is information sent by the device for receiving the article 200 after receiving the article. The dispatching state information includes at least one of the following states: the aircraft 100 is flying in a state that a new article cannot be delivered and dispatched; and the aircraft 100 has delivered the article and is in a state that a new article can be delivered and dispatched.

Alternatively, the dispatching device 300 is also configured to send the delivered information to an addresser and/or an addressee corresponding to article delivery.

After receiving the article, the device for receiving the article 200 sends the delivered information to the dispatching device 300, and the dispatching device 300 sends the delivered information to the addresser and/or the addressee corresponding to article delivery. Sending the delivered information to the addressee corresponding to article delivery is taken as an example, and the addressee may extract the article from the device for receiving the article 200 at any time after receiving the delivered information. There may be one or more device for receiving the articles 200, and the arrangement mode of the multiple devices for receiving the articles 200 is not limited. Therefore, the dispatching device 300 may send, according to the correspondence, the identity code and location information of the device for receiving the article 200 that receives the article to the addressee, and the addressee extracts the article according to the identity code or location information of the device for receiving the article 200. The dispatching device 300 may send the delivered information to the addresser and/or the addressee by using an electronic message in a short message form, a mail form and the like.

In order to further describe the article delivery system of the disclosure, the following embodiments describe an article delivery method for the present article delivery system from the perspective of the aircraft 100 and describe a method for receiving the article for the present article delivery system from the perspective of the device for receiving the article 200 respectively.

Embodiment 3

Figure 3:
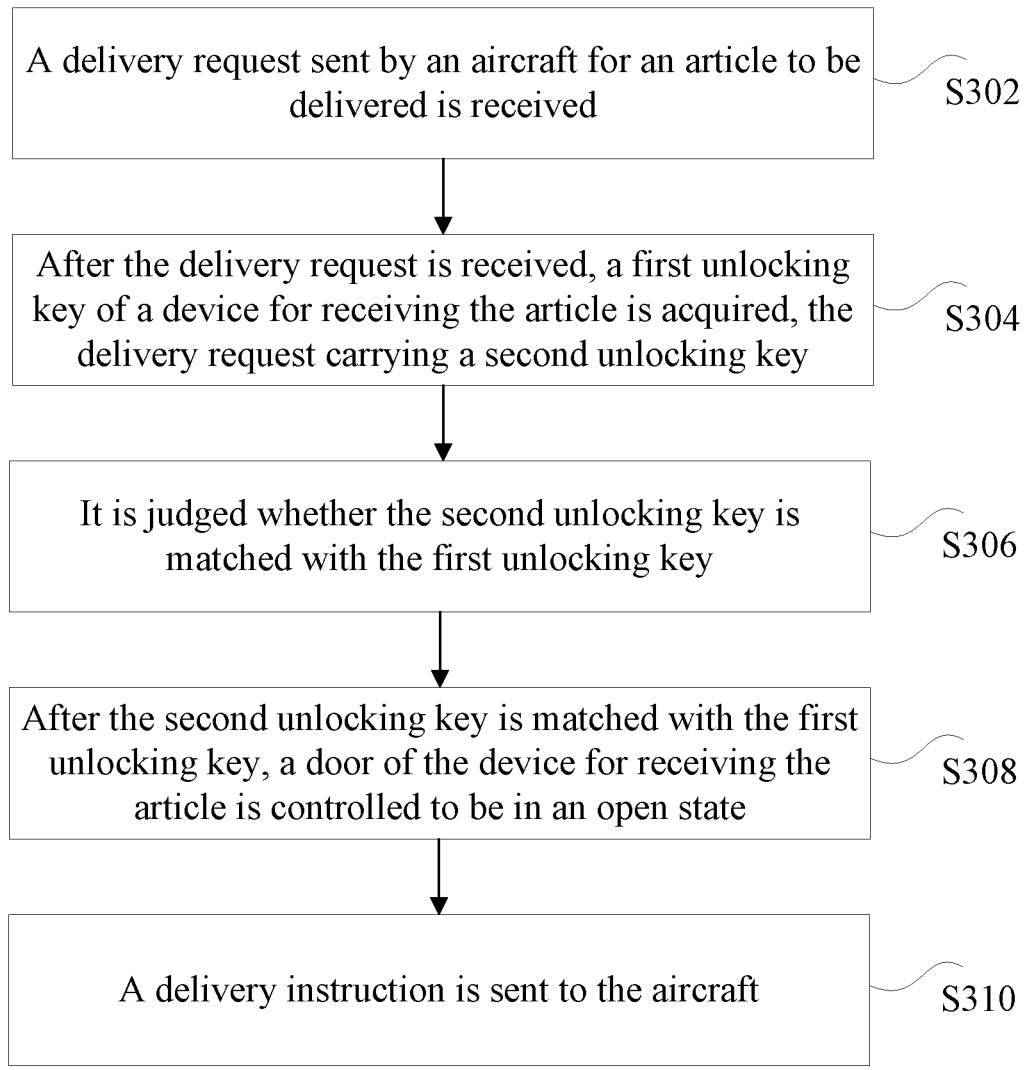
FIG. 3 is an alternative flowchart of a method for receiving article according to an embodiment of the disclosure.

The disclosure also provides an embodiment for a method for receiving the article. As shown in FIG. 3, the method for receiving the article includes the steps as follows.

S302: A delivery request sent by an aircraft for an article to be delivered is received.

S304: After the delivery request is received, a first unlocking key of a device for receiving the article is acquired, the delivery request carrying a second unlocking key.

S306: It is judged whether the second unlocking key is matched with the first unlocking key.

S308: After the second unlocking key is matched with the first unlocking key, a door of the device for receiving the article is controlled to be in an open state.

S310: A delivery instruction is sent to the aircraft.

The first unlocking key is a key of the device for receiving the article, the second unlocking key is an unlocking key of the aircraft, and the device for receiving the article verifies the unlocking key of the aircraft after receiving the delivery request sent by the aircraft to determine that the article delivered by the aircraft is an article capable of being received by the device for receiving the article, and judges whether to open a door of the aircraft. In a case that it is verified that the unlocking key of the aircraft is matched with the device for receiving the article, the door of the device for receiving the article is opened, the door is in an open state, and a delivery instruction is sent to the aircraft to instruct the aircraft to deliver the article. In this case, the device for receiving the article receives the article delivered by the aircraft. The unlocking key may be verified by codes, numbers, graphs and the like, and the unlocking key may be transmitted in a communication mode such as wifi, Bluetooth, mobile communication and the like.

In an embodiment of the disclosure, after the delivery instruction is sent to the aircraft and information for indicating that the aircraft completes delivery is detected, the door of the device for receiving the article is controlled to be in a closed state. That is to say, after article delivery is ended, the aircraft sends indicating information indicative of delivery completion to the device for receiving the article, the device for receiving the article closes the door, and the door is in a closed state.

It is judged whether the device for receiving the article receives the article delivered by the aircraft by means of matching between the device for receiving the article and the unlocking key of the aircraft, and after matching succeeds, the door of the device for receiving the article is controlled to be in an open state, and the aircraft is instructed to deliver the article, namely the aircraft can be automatically guided to deliver the article.

Alternatively, the second unlocking key may be an unlocking key sent to the aircraft from a dispatching center, the second unlocking key and the first unlocking key of the device for receiving the article are a pair of uniquely matched keys, and when the first unlocking key and the second unlocking key are matched, the door of the device for receiving the article can be controlled to be in an open state. Thus, even in a case that other aircrafts attempt to deliver articles to the device for receiving the article, as long as the second unlocking key carried by the aircraft is not matched with the unlocking key of the device for receiving the article, the device for receiving the article cannot open the door and cannot receive the article, so as to prevent the article from being wrongly delivered.

Alternatively, the first unlocking key includes at least one of the following keys: an unlocking key received through the Internet; an unlocking key stored on the device for receiving the article locally; and an unlocking key generated according to a preset key generation algorithm. The key storage module may be a module arranged on the device for receiving the article, the module is set when the device for receiving the article leaves the factory, and the first unlocking key is stored in the module. The preset key generation algorithm is stored in the key generation module, the algorithm may generate the first unlocking key, for example, the key generation module is controlled to generate the first unlocking key when the delivery request of the aircraft is received, and the unlocking key may be generated by means of a biological characteristic algorithm, an acoustic characteristic algorithm, a random number algorithm and the like.

Alternatively, it is first judged whether the device for receiving the article is large enough to receive the article delivered by the aircraft before delivering the article. That is, before the delivery instruction is sent to the aircraft, the method also includes: acquiring the volume of the article to be delivered; acquiring an available capacity of the device for receiving the article; judging whether the available capacity is greater than or equal to the volume; and when it is judged that the available capacity is greater than or equal to the volume, determining to send the delivery instruction to the aircraft.

Alternatively, acquiring an available capacity of the device for receiving the article includes: detecting whether an article is stored in the device for receiving the article; in a case that an article is stored in the device for receiving the article, calculating a residual capacity of the device for receiving the article according to a total capacity and an occupied capacity of the device for receiving the article, and taking the residual capacity as the available capacity; and in a case that an article is not stored in the device for receiving the article, taking the total capacity of the device for receiving the article as the available capacity.

When it is judged whether the available capacity of the device for receiving the article is greater than or equal to the volume of the article, the situation that the article has been stored in the device for receiving the article is taken into consideration. Therefore, it may be first judged whether an article is stored in the device for receiving the article.

In a case that an article is not stored in the device for receiving the article, the self-capacity of the device for receiving the article is the available capacity of the device for receiving the article, and when the available capacity is greater than or equal to the volume of the article, information for indicating that the delivery of the article is allowed is sent. In a case that an article is stored in the device for receiving the article, a residual capacity obtained by subtracting the volume of the stored article from the self-capacity of the device for receiving the article is the available capacity of the device for receiving the article. Likewise, when the available capacity is greater than or equal to the volume of the article, information for indicating that the delivery of the article is allowed is sent. In a case that the available capacity is smaller than the volume of the article, indicating information for indicating that delivery cannot be performed is sent to the aircraft.

Alternatively, after the delivery instruction is sent to the aircraft, the method also includes: receiving indicating information for conveying the article in the device for receiving the article; and conveying the article in the device for receiving the article out of the device for receiving the article according to the indicating information. A conveying device may convey the article to a specified location such as an article sorting platform or an article shelf. The conveying device may conveniently convey out some large articles or multiple articles.

Alternatively, after the article delivered by the aircraft is received, the method also includes: sending a message indicating that the article has been delivered. The device for receiving the article may detect the received article, control the door to be closed through an unlocking device, and send the message indicating that the article has been delivered. Delivered information sent by the device for receiving the article can prompt that the user may extract the article.

Alternatively, after the delivery instruction is sent to the aircraft, the method also includes: receiving indicating information for a user to open the door of the device for receiving the article; and controlling, according to the indicating information, the door to be in an open state.

Indicating information for opening the door of the device for receiving the article may be identity authentication information adopting an NFC manner, a radio frequency manner, a Bluetooth manner, a password manner or other manners. The identity information of the user is authenticated, and then the door is opened, so it can be ensured that the article is extracted by the corresponding user, and the safety of the article is ensured.

Embodiment 4

Figure 4:
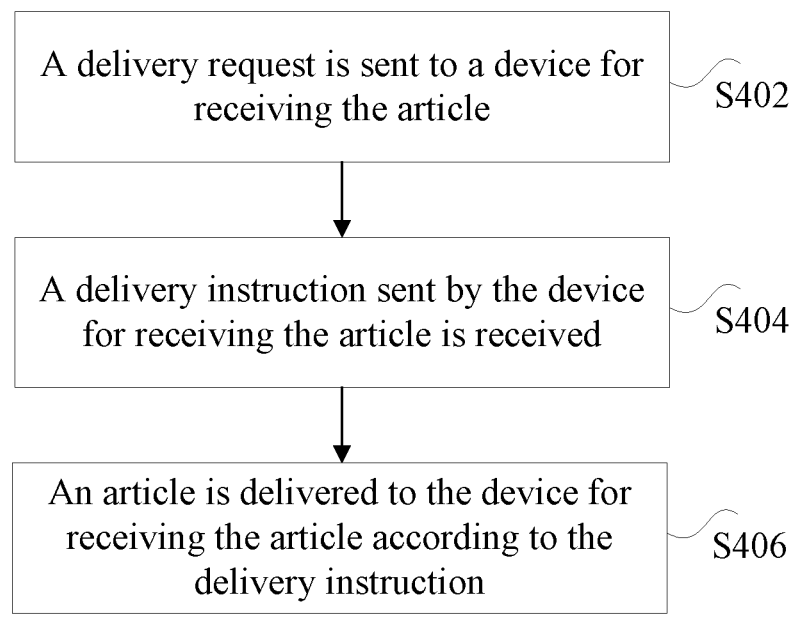
FIG. 4 is an alternative flowchart of an article delivery method according to an embodiment of the disclosure.

The disclosure also provides an embodiment for an article delivery method. As shown in FIG. 4, the article delivery method includes the steps as follows.

S402: A delivery request is sent to a device for receiving the article.

S404: A delivery instruction sent by the device for receiving the article is received, wherein the delivery instruction is an instruction in response to the delivery request after a first unlocking key and a second unlocking key of the device for receiving the article are successfully matched, the second unlocking key is an unlocking key carried by the delivery request.

S406: An article is delivered to the device for receiving the article according to the delivery instruction.

An aircraft sends a delivery request to a device for receiving the article. That is, when the aircraft lands on the device for receiving the article or hovers over the device for receiving the article to be prepared for delivering an article, a delivery request of the aircraft is sent to the device for receiving the article, the delivery request carrying a second unlocking key. After the device for receiving the article receives the second unlocking key, unlocking matching is performed between the second unlocking key and a first unlocking key of the device for receiving the article. After the first unlocking key and the second unlocking key are matched, the aircraft receives a delivery instruction sent by the device for receiving the article, and the aircraft is instructed to deliver the article. After receiving the delivery instruction, the aircraft delivers the article to the device for receiving the article. Before the aircraft delivers the article, a door of the device for receiving the article will be opened after unlocking matching succeeds, and the door is controlled to be in an open state to be prepared for receiving the article delivered by the aircraft.

By means of the embodiment, the aircraft sends the unlocking key to the device for receiving the article to perform unlocking matching, the delivery instruction is received after unlocking matching succeeds, and the aircraft delivers the article according to the delivery instruction. The door of the device for receiving the article has been opened during delivery, so the aircraft may complete an automatic article delivery action.

Alternatively, before the delivery instruction sent by the device for receiving the article is received, the method also includes: receiving a volume query request sent by the device for receiving the article, the volume query request is used for requesting to query the volume of the article; and sending, in response to the volume query request, the volume of the article to the device for receiving the article. The volume of the article sent by the aircraft enables the device for receiving the article to judge whether a current available capacity can meet space requirements of the article, i.e., to judge whether the device for receiving the article can hold the article. In a case that the device for receiving the article can hold the article, it is determined that the article can be received. Otherwise, the article is refused to be received.

Alternatively, before the delivery request is sent to the device for receiving the article, the method also includes: acquiring location information of the device for receiving the article waiting for receiving the article; searching for the device for receiving the article according to the location information; and after the device for receiving the article is found, landing on the found device for receiving the article according to a guidance identifier of the device for receiving the article.

The location information of the device for receiving the article waiting for receiving the article may be three-dimensional GPS coordinates, and the device for receiving the article is searched according to the location information of the device for receiving the article. The location of the device for receiving the article, found through the GPS coordinates, deviates from an actual location of the device for receiving the article. Therefore, the aircraft accurately determines the location of the device for receiving the article according to the guidance identifier of the device for receiving the article, and lands on the device for receiving the article, and an undercarriage fixing position on the device for receiving the article fixes the aircraft to make it convenient for the aircraft to deliver the article.

Alternatively, searching for the device for receiving the article according to the location information includes: acquiring a route of flight to the device for receiving the article corresponding to the location information; and flying to the device for receiving the article according to the route. A dispatching device stores the location information of the device for receiving the article waiting for receiving the article, generates a flight route according to the location information, and sends the route to the aircraft. The aircraft flies to the place where the device for receiving the article is located according to the flight route sent by the dispatching device, and then the aircraft lands on the device for receiving the article by utilizing the guidance identifier on the device for receiving the article.

Alternatively, after the article is delivered to the device for receiving the article according to the delivery instruction, the method also includes: acquiring a return route, and returning according to the return route; or acquiring a flight route of a next delivery destination, and flying to the next delivery destination according to the flight route. The aircraft may deliver articles to one or more delivery destinations, and when fulfilling a delivery task of one destination, the aircraft may return according to the return route; and the route of the next delivery destination may also be acquired, so the aircraft flies to the next destination.

Alternatively, in order to guarantee that the residual electricity of the aircraft can meet requirements for next delivery and to avoid insufficient electricity of the aircraft in a flight process, before the aircraft flies to the next destination, in a case that the residual battery capacity can meet requirements for reaching the next destination, the aircraft flies according to the flight route of the next delivery destination, and otherwise, the aircraft may directly return.

That is, the step of acquiring a flight route of a next delivery destination and flying to the next delivery destination according to the flight route includes: acquiring a flight route of the next delivery destination; calculating, according to the flight route, a battery capacity needed for the aircraft to fly from a current location to the next delivery destination; acquiring a current residual battery capacity of the aircraft; judging whether the current residual battery capacity of the aircraft is greater than the battery capacity needed for the aircraft to fly from the current location to the next delivery destination; and if so, flying to the next delivery destination according to the flight route.

By means of the abovementioned steps, the articles may be delivered to one or more destinations, and automatic delivery to each destination is achieved through unlocking matching.

The embodiment of the disclosure is illustrated with an unmanned aerial vehicle.

A dispatching device sends a first unlocking key to a device for receiving the article, and sends a second unlocking key to the unmanned aerial vehicle.

The dispatching device sends a flight route to the unmanned aerial vehicle, and the unmanned aerial vehicle flies to a destination where the device for receiving the article is located according to the flight route.

When reaching the destination, the unmanned aerial vehicle detects a guidance identifier (i.e., QR code) on the device for receiving the article, hovers over the device for receiving the article by utilizing the QR code or lands on the device for receiving the article, wherein the guidance identifier of the device for receiving the article may be a graph, an image or the like.

The unmanned aerial vehicle lands at an undercarriage fixing position of the device for receiving the article according to the guidance identifier, and a body of the unmanned aerial vehicle is fixed to the device for receiving the article through the fixing position. The fixing position may be a U-shaped groove, a certain space can be provided for the unmanned aerial vehicle to move longitudinally along the U-shaped groove on the basis of an undercarriage for fixing the unmanned aerial vehicle, and the tolerance of landing of the unmanned aerial vehicle is improved.

The unmanned aerial vehicle sends the second unlocking key to the device for receiving the article, the device for receiving the article matches the first unlocking key stored therein with the second unlocking key of the unmanned aerial vehicle, after matching succeeds, an unlocking device of the device for receiving the article is instructed to control a door of the device for receiving the article to be opened, and the door is controlled to be in an open state.

The device for receiving the article sends an instruction for article delivery to the unmanned aerial vehicle. After receiving the instruction, the unmanned aerial vehicle delivers an article to the device for receiving the article. By unlocking matching, the door can be automatically opened, and the device for receiving the article can automatically receive the delivered article.

A damping device is arranged in the device for receiving the article to prevent the article from being damaged during article delivery.

When the device for receiving the article receives the article, the unlocking device is controlled to close the door, the door is controlled to be in a closed state, and an instruction for closing the door is sent to the dispatching device.

The device for receiving the article also sends delivered information to the dispatching device, and updates dispatching state information of the aircraft according to the delivered information. The dispatching device sends the delivered information to a user, the user receives the delivered information through a short message, a mail or the like, and the user may be an addresser and/or an addressee. The dispatching state information includes: information indicating that the aircraft is flying and delivery dispatching of a new article cannot be received; and information indicating that the article has been delivered and delivery dispatching of a new article can be received.

After receiving the delivered information, the addresser opens the device for receiving the article in an identification manner such as NFC and radio frequency, thus achieving extraction of the article.

The unmanned aerial vehicle that fulfills a current delivery task may return to a take-off place, and may fly to a next destination according to the instruction of the dispatching device.

Before flying to the next destination, the unmanned aerial vehicle detects whether the current electricity meets flight requirements, if so, the unmanned aerial vehicle flies to the next destination, and if not, the unmanned aerial vehicle returns.

By means of the embodiment, the device for receiving the article is used to automatically receive the article delivered by the unmanned aerial vehicle, the dispatching device notifies the user to extract the article, and the user may extract the article at convenience without artificially assisting in landing of the unmanned aerial vehicle and taking down of the article during article receiving. The problem in the conventional art where an article cannot be automatically unloaded by the unmanned aerial vehicle after being delivered to a destination is solved, and the effects of automatically guiding the unmanned aerial vehicle to land and receiving the article unloaded from the unmanned aerial vehicle are achieved. Moreover, password matching is performed during article delivery, thus ensuring the safety of the article. Furthermore, the unmanned aerial vehicle may deliver the articles to one or more destinations, thus improving the article delivery efficiency.

It is important to note that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The sequence numbers of the embodiments of the disclosure are only used for descriptions, and do not represent the preference of the embodiments.

In the abovementioned embodiments of the disclosure, descriptions for each embodiment are emphasized respectively, and parts which are not elaborated in detail in a certain embodiment may refer to relevant descriptions for other embodiments.

In some embodiments provided by the disclosure, it should be understood that the disclosed technical content may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, units or modules, and may be electrical or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

When being implemented in form of software function module and sold or used as an independent product, the integrated unit may be stored in a computer-readable storage medium. Based on such an understanding, the technical solutions of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as a U disk, a Read-Only Memory (ROM), a Random Access Memory (RAM), a mobile hard disk, a magnetic disk or an optical disk.

The above is only the preferable implementation mode of the disclosure. It should be pointed out that some improvements and modifications apparent to a person of ordinary skill in the art may also be made without departing from the principle of the disclosure. These improvements and modifications shall fall within the scope of protection of the disclosure.

What is claimed is:

1. A device for receiving an article, comprising:
    a box body;
    a door, arranged on the box body;
    a wireless communication module connected with the door and comprising a first hardware processor configured to execute the following program module stored on a first memory: performing unlocking matching with an aircraft, controlling the door to be in an open state after unlocking matching succeeds, and sending a delivery instruction to the aircraft, and
    a second hardware processor configured to execute the following program module stored on a second memory: detecting, when an available capacity of the box body is acquired, whether another article is stored in the box body, wherein
    when it is detected that another article is stored in the box body, a residual capacity of the box body is calculated according to a total capacity and an occupied capacity of the box body, and the residual capacity serves as the available capacity; and
    when it is detected that another article is not stored in the box body, the total capacity of the box body serves as the available capacity.

2. The device for receiving an article as claimed in claim 1, wherein the wireless communication module is further configured to control the door to be in a closed state after the box body receives a delivered article.

3. The device for receiving an article as claimed in claim 1, wherein the second hardware processor is further configured to execute the following program modules stored on the second memory:
    a delivery judgment module, configured to acquire the available capacity of the box body, and judge whether the available capacity of the box body is greater than or equal to the volume of the article; and
    a delivery indicating module, configured to send information for indicating that the delivery of the article is allowed, when the available capacity of the box body is greater than or equal to the volume of the article.

4. The device for receiving an article as claimed in claim 1, further comprising:
    a conveying device, configured to convey the article in the box body out of the box body.

5. The device for receiving an article as claimed in claim 2, further comprising:
    an unlocking device, configured to: receive, after unlocking matching between the wireless communication module and the aircraft succeeds, a control instruction of the wireless communication module to control the door to be opened; and/or receive, after the article is received, a control instruction of the wireless communication module to control the door to be closed.

6. The device for receiving an article as claimed in claim 1, wherein the first or second hardware processor is configured to execute at least one of the following modules stored on the first or second memory:
    an internet communication module, to receive a first unlocking key through the internet, wherein the first unlocking key is used for performing unlocking matching with a second unlocking key carried by the aircraft;
    a key storage module, to store the first unlocking key on the device for receiving article locally; and
    a key generation module, to generate the first unlocking key according to a preset key generation algorithm.

7. The device for receiving an article as claimed in claim 1, further comprising:
    an undercarriage fixing position, arranged at an edge of an upper surface of the box body, wherein the undercarriage fixing position is provided with a fixing groove for fixing an undercarriage of the aircraft.

8. The device for receiving an article as claimed in claim 1, further comprising:
    a damping device, arranged in the box body and configured to prevent the article from falling down from the aircraft to be damaged.

9. A method for receiving an article, comprising:
    receiving a delivery request sent by an aircraft for an article to be delivered;
    after the delivery request is received, acquiring a first unlocking key of a device for receiving the article, wherein the delivery request carries a second unlocking key;
    judging whether the second unlocking key is matched with the first unlocking key;
    after the second unlocking key is matched with the first unlocking key, controlling a door of the device for receiving article to be in an open state; and
    sending a delivery instruction to the aircraft,
    wherein the method further comprises acquiring an available capacity of the device for receiving the article by the following steps:

detecting whether another article is stored in the device for receiving the article;

in a case that another article is stored in the device for receiving the article, calculating a residual capacity of the device for receiving the article according to a total capacity and an occupied capacity of the device for receiving the article, and taking the residual capacity as the available capacity; and in a case that another article is not stored in the device for receiving the article, taking the total capacity of the device for receiving the article as the available capacity.

10. The method as claimed in claim 9, after the delivery instruction is sent to the aircraft, the method further comprising:

after information for indicating that the aircraft completes delivery is detected, controlling the door of the device for receiving the article to be in a closed state.

11. The method as claimed in claim 9, before the delivery instruction is sent to the aircraft, the method further comprising:

acquiring the volume of the article to be delivered;

judging whether the available capacity is greater than or equal to the volume; and when it is determined that the available capacity is greater than or equal to the volume, determining to send the delivery instruction to the aircraft.

12. The method as claimed in claim 9, after the delivery instruction is sent to the aircraft, the method further comprising:

receiving indicating information for conveying the article in the device for receiving the article; and conveying the article in the device for receiving the article out of the device for receiving the article according to the indicating information.

13. The method as claimed in claim 9, wherein the first unlocking key comprises at least one of the following keys:

an unlocking key received through the internet;

an unlocking key stored on the device for receiving the article locally; and an unlocking key generated according to a preset key generation algorithm.

14. An article delivery method, comprising:

sending a delivery request to a device according to claim 1 for receiving the article;

receiving a delivery instruction sent by the device for receiving the article, wherein the delivery instruction is an instruction in response to the delivery request after a first unlocking key and a second unlocking key of the device for receiving the article are successfully matched, the second unlocking key is an unlocking key carried by the delivery request; and delivering the article to the device for receiving the article according to the delivery instruction.

15. The method as claimed in claim 14, before the delivery instruction sent by the device for receiving the article is received, the method further comprising:

receiving a volume query request sent by the device for receiving the article, wherein the volume query request is used for requesting to query the volume of the article; and sending, in response to the volume query request, the volume of the article to the device for receiving the article.

16. The method as claimed in claim 14, before the delivery request is sent to the device for receiving the article, the method further comprising:

acquiring location information of the device for receiving the article waiting for receiving the article;

searching for the device for receiving the article according to the location information; and after the device for receiving the article is found, landing on the found device for receiving the article according to a guidance identifier of the device for receiving the article.

17. The method as claimed in claim 16, wherein searching for the device for receiving the article according to the location information comprises:

acquiring a route of flight to the device for receiving the article corresponding to the location information; and flying to the device for receiving the article according to the route.

18. The method as claimed in claim 15, after the article is delivered to the device for receiving the article according to the delivery instruction, the method further comprising:

acquiring a return route, and returning according to the return route; or acquiring a flight route of a next delivery destination, and flying to the next delivery destination according to the flight route.

* * * * *